(12) United States Patent
Park et al.

(10) Patent No.: US 12,224,401 B2
(45) Date of Patent: Feb. 11, 2025

(54) SYSTEM AND METHOD OF MANUFACTURING LITHIUM ION SECONDARY BATTERY

(71) Applicants: HYUNDAI MOTOR COMPANY, Seoul (KR); KIA MOTORS CORPORATION, Seoul (KR)

(72) Inventors: Sang Mok Park, Gwangju-si (KR); Jin Hee Lee, Changwon-si (KR); Se Young Lee, Seoul (KR); Dong Hui Kim, Suwon-si (KR); Shin Kook Kong, Hwaseong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 226 days.

(21) Appl. No.: 16/837,156

(22) Filed: Apr. 1, 2020

(65) Prior Publication Data
US 2021/0159543 A1    May 27, 2021

(30) Foreign Application Priority Data
Nov. 27, 2019 (KR) .......................... 10-2019-0154791

(51) Int. Cl.
*H01M 10/0585* (2010.01)
*H01M 4/04* (2006.01)
*H01M 10/0525* (2010.01)

(52) U.S. Cl.
CPC ..... *H01M 10/0585* (2013.01); *H01M 4/0404* (2013.01); *H01M 10/0525* (2013.01); *H01M 2220/20* (2013.01)

(58) Field of Classification Search
CPC .. H01M 4/139; H01M 10/058; H01M 4/0404; H01M 10/0585; F26B 21/004; F26B 21/04; F26B 21/00; F26B 21/06; F26B 3/12; F26B 13/104; F26B 13/108; F26B 5/047; F26B 15/00; F26B 17/02; F26B 17/023; F26B 13/002; B05D 3/0413
USPC .................................... 427/541, 314; 118/58
See application file for complete search history.

(56) References Cited

U.S. PATENT DOCUMENTS

| | | | | |
|---|---|---|---|---|
| 2009/0081518 | A1* | 3/2009 | Miyachi | B01D 71/68 429/490 |
| 2010/0269366 | A1* | 10/2010 | Kitamoto | F26B 3/283 34/636 |
| 2015/0086866 | A1* | 3/2015 | Park | H01M 10/052 429/211 |
| 2019/0356014 | A1* | 11/2019 | Abe | H01M 50/491 |

FOREIGN PATENT DOCUMENTS

| | | | |
|---|---|---|---|
| DE | 112019005644 | * | 10/2021 |
| JP | 2012119095 | * | 6/2012 |
| JP | 2015-011964 | * | 1/2015 |

(Continued)

*Primary Examiner* — Tabassom Tadayyon Eslami
(74) *Attorney, Agent, or Firm* — MCDONNELL BOEHNEN HULBERT & BERGHOFF LLP (57) ABSTRACT

A system for manufacturing a lithium ion secondary battery includes an unwinder supplying a current collector to be coated to a predetermined position, a coating device coating a coating liquid on the current collector, a drying device drying the coated current collector, and a rewinder winding the coated current collector passing through the drying device at a predetermined position.

2 Claims, 6 Drawing Sheets width direction of current collector (56) References Cited

FOREIGN PATENT DOCUMENTS

| KR | 10-1475429 B1 | 12/2014 |
| KR | 2016-0110222 A | 9/2016 |
| KR | 2018-0023634 A | 3/2018 |

\* cited by examiner

FIG. 1

PRIOR ART

FIG. 2

FIG. 3 width direction
of current collector width direction
of current collector

FIG. 6B present invention

FIG. 7

SYSTEM AND METHOD OF MANUFACTURING LITHIUM ION SECONDARY BATTERY

CROSS REFERENCE TO RELATED APPLICATION

The present application claims priority to Korean Patent Application No. 10-2019-0154791, filed Nov. 27, 2019, the entire contents of which is incorporated herein for all purposes by this reference.

BACKGROUND

Field

The present disclosure relates to a system and a method of manufacturing a lithium ion secondary battery.

Description of the Related Art

In order to cope with air pollution and global warming, there is a need to reduce the amount of carbon dioxide in the atmosphere. In the automobile industry, there is a great expectation for the reduction of carbon dioxide emission by introduction of electric vehicles and hybrid electric vehicles, and the development of lithium ion secondary batteries for motor driving, which holds the key to their practical use, is being actively performed.

Figure 1:
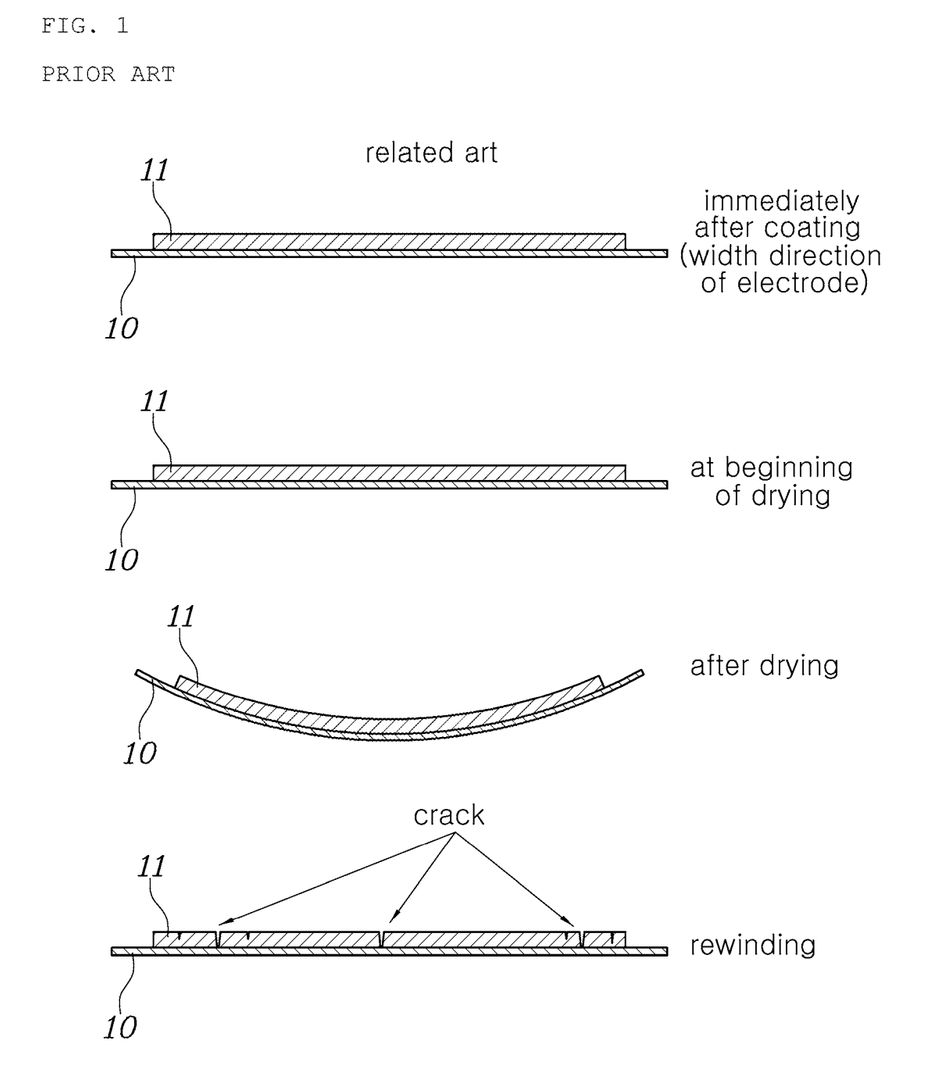
FIG. 1 is a view showing a state of an electrode immediately after coating, at the beginning of drying, after drying, and during rewinding in the related art.

Meanwhile, in order to increase energy density of the lithium ion secondary batteries as high energy of the lithium ion secondary batteries is required, a method of reducing the amount of binder or improving electrode adhesion through thickening of an electrode and application of a high performance binder is used. However, the thickening of the electrode and the use of the high-performance binder may cause electrode deformation which may occur due to shrinkage of the electrode during the course of a drying process of the electrode after coating. This may lead to a problem that when the electrode comes into contact with a roll after the drying process, cracks may be generated in the electrode as shown in FIG. 1 or wrinkles or the like may be generated in an uncoated portion of the electrode.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and an objective of the present disclosure is to provide a system and a method of manufacturing a lithium ion secondary battery in which drying is performed in a state in which an electrode is maintained in a specific shape at the beginning of drying in consideration of a deformation amount of the electrode after drying, thereby making it possible to minimize occurrence of cracks in the electrode or wrinkles in an uncoated portion of the electrode due to shrinkage of the electrode when the electrode is rewound on a roll after drying.

In order to achieve the above objective, according to one aspect of the present disclosure, there is provided a system for manufacturing a lithium ion secondary battery, the system including: an unwinder supplying a current collector to be coated to a predetermined position; a coating device coating a coating liquid on the current collector; a drying device drying the coated current collector; and a rewinder winding the coated current collector passing through the drying device at a predetermined position.

The system may further include at least one of: a plurality of driving rolls supporting the coated current collector that moves in the drying device, and moving the current collector through a rotary motion; a drying nozzle drying the coated current collector moving through the driving rolls by air of a predetermined temperature and a predetermined amount; a sensor sensing a degree of drying of a coating layer coated on the current collector; and a controller controlling driving of the drying nozzle on the basis of information sensed by the sensor.

Each of the driving rolls may be configured such that a gradient may be formed in a width direction of the current collector moving through the driving rolls, whereby a gradient may be formed on the current collector in the width direction of the current collector moving through the driving rolls.

Each of the driving rolls may be configured such that the gradient thereof may be flat at a central portion of the width direction of the current collector and may gradually increase from the central portion toward opposite sides of the width direction of the current collector.

An amount of a gradient formed on each of the plurality of driving rolls may be configured such that the amount of the gradient formed on a driving roll located at an inlet of the drying device may be the largest, and the amount of the gradient formed on each of the driving rolls may gradually decrease toward an outlet of the drying device.

A gradient may be formed on the drying nozzle in a width direction of the current collector moving through the driving rolls, such that when the air of the predetermined temperature and the predetermined amount is sprayed toward to the current collector moving through the driving rolls, a gradient may be formed on the current collector in the width direction thereof.

The drying nozzle may spray the air toward the current collector by forming a gradient in wind speed in a width direction of the current collector moving through the driving rolls, such that a gradient may be formed on the current collector in the width direction thereof.

The controller may allow the air to be sprayed from the drying nozzle such that an amount of gradient may be maximum in a state in which the coating layer has fluidity on the basis of the degree of drying of the coating layer sensed by the sensor, and the controller may allow an amount of the air sprayed from the drying nozzle to be decreased such that the amount of gradient may decrease as the degree of drying of the coating layer increases.

According to another aspect of the present disclosure, there is provided a method of manufacturing a lithium ion secondary battery, the method including: preparing an unwinder supplying a current collector to be coated to a predetermined position, a coating device coating a coating liquid on the current collector, a drying device including a driving roll and a drying nozzle and drying the coated current collector, and a rewinder winding the coated current collector passing through the drying device at a predetermined position; coating, by the coating device, a coating liquid on the current collector unwound from the unwinder; drying the coated current collector by the driving device; and rewinding, by the rewinder, the current collector in which the coating liquid is dried, at a predetermined position.

The method may further include preparing a sensor sensing a degree of drying of a coating layer coated on the current collector, and a controller controlling driving of the drying nozzle on the basis of information sensed by the sensor.

The preparing the drying device including the driving roll and the drying nozzle and drying the coated current collector may further include forming a gradient on each of the driving roll and the drying nozzle in a width direction of the current collector.

In the forming the gradient on each of the driving roll and the drying nozzle in the width direction of the current collector, a shape of the gradient may be changed by increasing or decreasing radius of curvature on the basis of a circle.

In the forming the gradient on each of the driving roll and the drying nozzle in the width direction of the current collector, a shape of the gradient may be changed by increasing or decreasing eccentricity on the basis of an ellipse with the same semi-major axis.

The eccentricity may be 0.7 to 0.99, and the semi-minor axis may be equal to or greater than 1.2 times a width of the current collector.

In the forming the gradient on each of the driving roll and the drying nozzle in the width direction of the current collector, a shape of the gradient may be changed by increasing or decreasing eccentricity on the basis of an ellipse with the same semi-minor axis.

The eccentricity may be 0.7 to 0.99, and the semi-minor axis may be equal to or less than 0.2 times a width of the current collector.

The drying the coated current collector by the drying device may further include: sensing, by a sensor, a degree of drying of a coating layer coated on the current collector; and controlling driving of the drying nozzle on the basis of sensed information.

The controlling the driving of the drying nozzle on the basis of the sensed information may be performed by allowing a maximum amount of air to be sprayed from the drying nozzle such that an amount of gradient may be maximum in a state in which the coating layer has fluidity, and by allowing an amount of air sprayed from the drying nozzle to be decreased such that the amount of gradient may decrease as the degree of drying of the coating layer increases.

According to the present disclosure, by performing drying in a state in which the electrode is maintained in a specific shape at the beginning of drying in consideration of a deformation amount of the electrode after drying, it is possible to minimize occurrence of cracks in the electrode or wrinkles in the uncoated portion of the electrode due to shrinkage of the electrode when the electrode is rewound on a roll after drying.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Hereinbelow, exemplary embodiments of the present disclosure will be described in detail with reference to the accompanying drawings. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Specific structural and functional descriptions of embodiments of the present disclosure disclosed herein are only for illustrative purposes of the preferred embodiments of the present disclosure, and the present description is not intended to represent all of the technical spirit of the present disclosure. On the contrary, the present disclosure is intended to cover not only the exemplary embodiments, but also various alternatives, modifications, equivalents and other embodiments that may be included within the spirit and scope of the present disclosure as defined by the appended claims.

Figure 2:
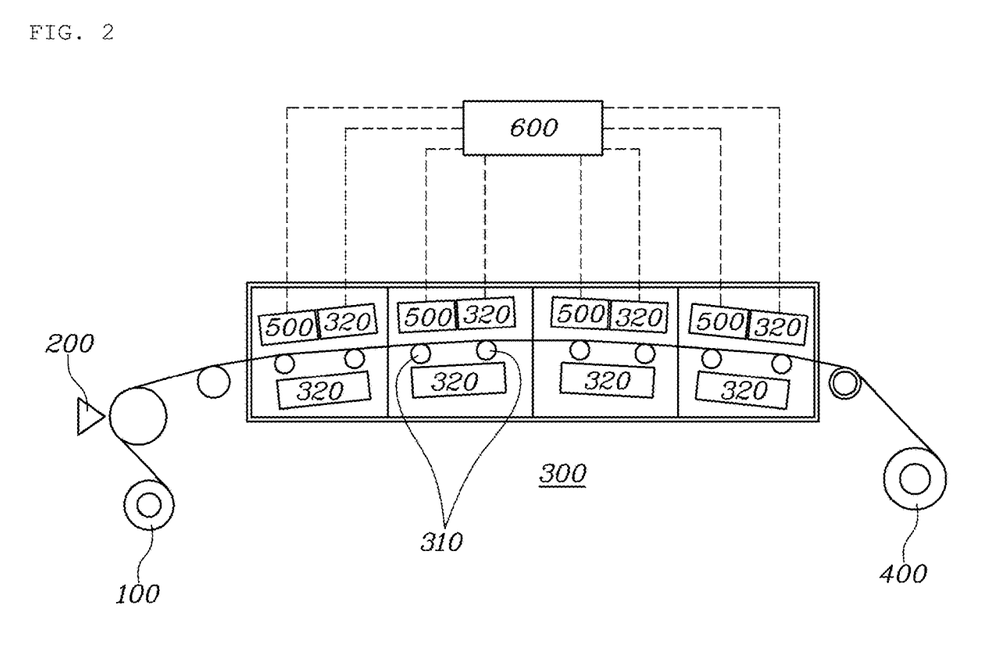
FIG. 2 is a view showing a configuration of a system for manufacturing a lithium ion secondary battery according to an embodiment of the present disclosure.
Figure 3:
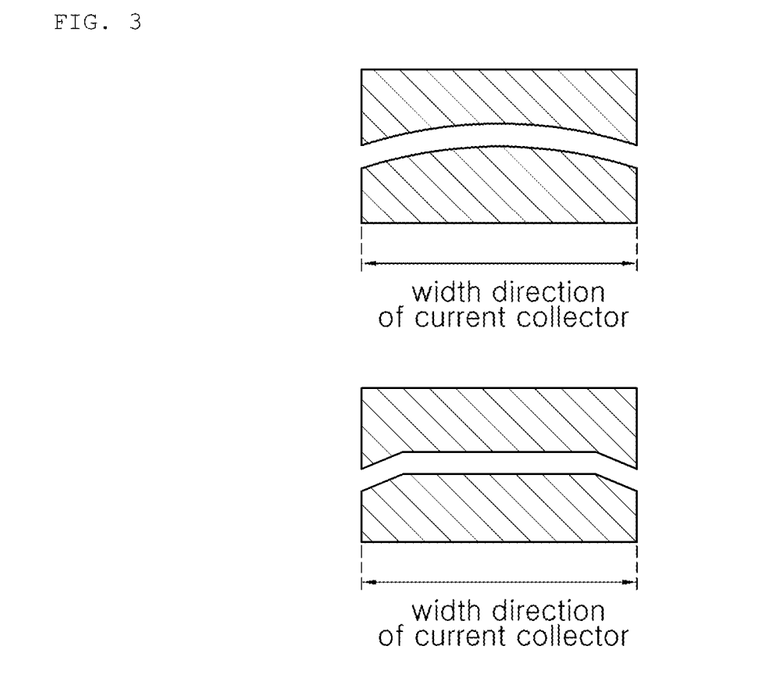
FIG. 3 is a view showing a gradient formed on a drying nozzle in the system for manufacturing the lithium ion secondary battery according to the embodiment of the present disclosure.
Figure 4:
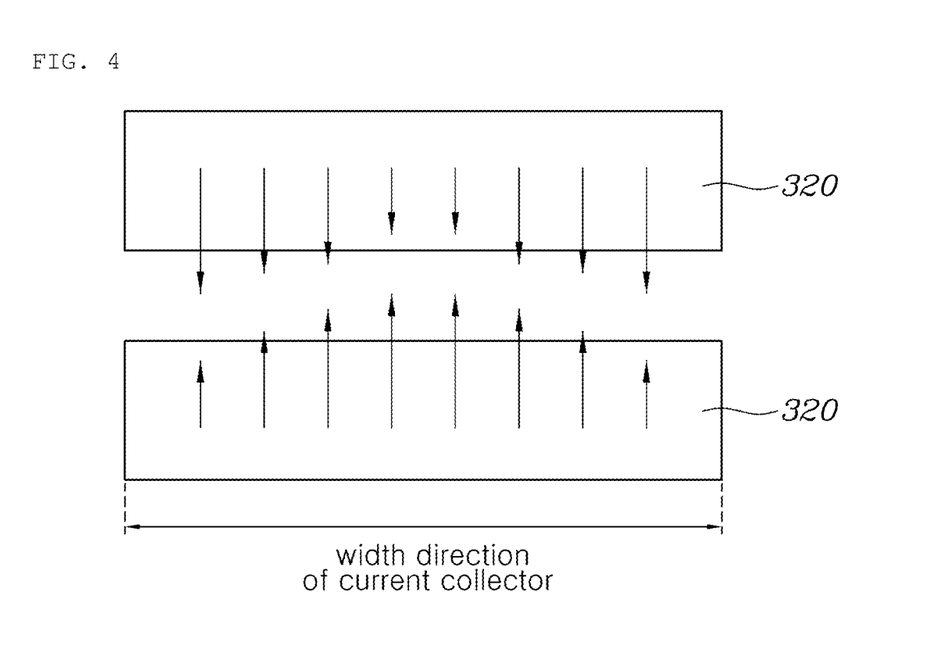
FIG. 4 is a view showing that a wind speed gradient is formed on the drying nozzle in a width direction of a current collector in the system for manufacturing the lithium ion secondary battery according to the embodiment of the present disclosure.
Figure 5:
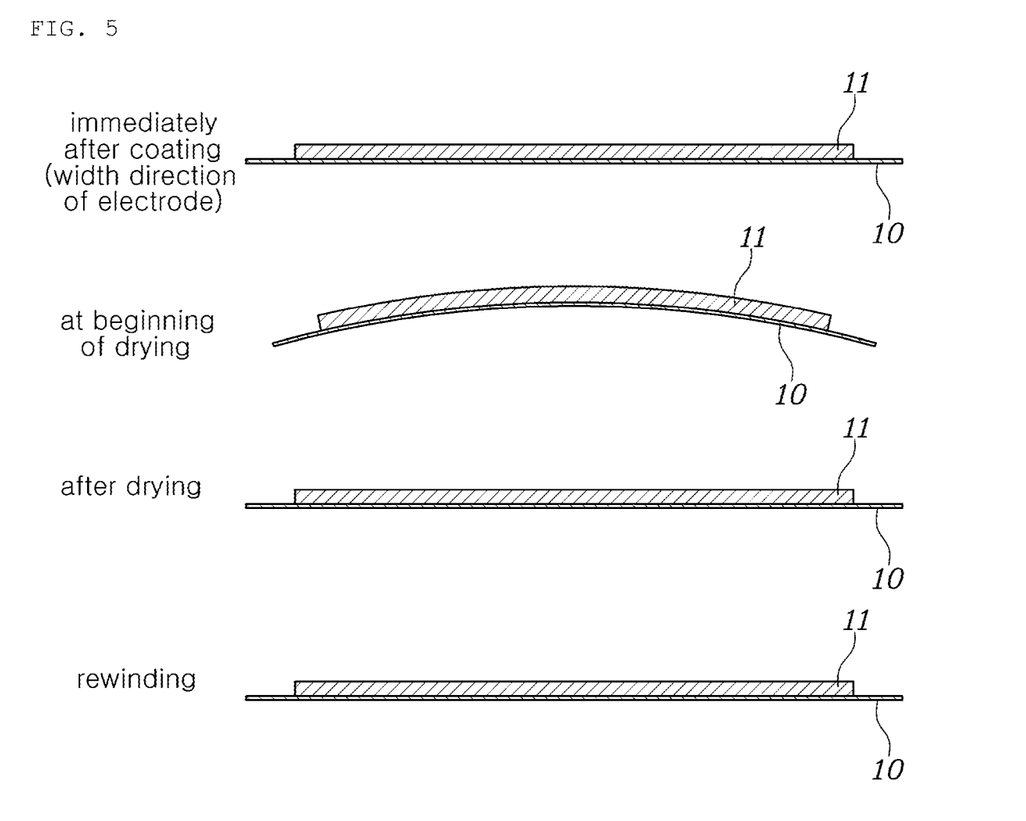
FIG. 5 is a view showing a state of an electrode immediately after coating, at the beginning of drying, after drying, and during rewinding in the system for manufacturing the lithium ion secondary battery according to the embodiment of the present disclosure.

FIG. 2 is a view showing a configuration of a system for manufacturing a lithium ion secondary battery according to an embodiment of the present disclosure, FIG. 3 is a view showing a gradient formed on a drying nozzle in the system for manufacturing the lithium ion secondary battery according to the embodiment of the present disclosure, FIG. 4 is a view showing that a wind speed gradient is formed on the drying nozzle in a width direction of a current collector in the system for manufacturing the lithium ion secondary battery according to the embodiment of the present disclosure, and FIG. 5 is a view showing a state of an electrode immediately after coating, at the beginning of drying, after drying, and during rewinding in the system for manufacturing the lithium ion secondary battery according to the embodiment of the present disclosure;

Referring to FIG. 2, the system for manufacturing the lithium ion secondary battery according to the embodiment of the present disclosure may include an unwinder 100, a coating device 200, a drying device 300, and a rewinder 400. The system may further include at least one of a plurality of driving rolls 310, a drying nozzle 320, a sensor 500 for sensing the degree of drying of a coating layer coated on a current collector, and a controller 600 for controlling driving of the drying nozzle on the basis of information sensed by the sensor.

The unwinder 100 serves to supply the current collector to be coated to a predetermined position. That is, the unwinder 100 may unwind the current collector wound on a roll before coating. In addition, although not shown in detail in the drawings, the unwinder 100 may include a driving unit for unwinding the current collector wound on the roll. Furthermore, the unwinder 100 may allow the current collector wound on the roll to be unwound to a predetermined position with a constant tension.

The coating device 200 may be a device for coating a coating liquid on the current collector. Herein, the coating device 200 may allow the coating liquid to be coated in a predetermined amount on a predetermined position on the current collector supplied from the unwinder 100. In one embodiment, the coating device 200 may coat the coating liquid on the current collector by spraying, but this is only one embodiment. Therefore, as long as the coating liquid can be coated in the predetermined amount on the predetermined position on the current collector, various other types of devices can be used as the coating device in the present disclosure.

The drying device 300 serves to dry the coated current collector. Herein, the drying device 300 may include a hermetically sealed housing in which a space for moving the coated current collector is formed, such that the drying device may dry the coated current collector by evaporating a solvent of the coating liquid by convection of heat to the air in the housing.

In detail, the drying device 300 may include the plurality of driving rolls for supporting the coated current collector moving in the drying device 300 and for moving the current collector through a rotary motion, and the drying nozzle for drying the coated current collector moving therein through the driving rolls 310 by spraying the air of a predetermined temperature and a predetermined amount.

Herein, each of the driving rolls 310 may be configured such that a gradient is formed in the width direction of the current collector moving through the driving rolls. In one embodiment, each of the driving rolls 310 may be configured such that the gradient thereof is flat at a central portion of the width direction of the current collector and gradually increases from the central portion toward opposite sides of the width direction of the current collector.

Meanwhile, the reason for forming the gradient on each of the driving rolls in the width direction of the current collector in the present disclosure is as follows.

A problem occurring in the related art will be described with reference to FIG. 1. In the related art, a solvent of a coating liquid is completely evaporated after drying during the course of a drying process, and an electrode warps as a coating layer coated on a current collector shrinks. Then, the electrode in a warped state passes through rolls and is horizontally stretched in response to application of an external force in the course of being rewound through a rewinder. During this course, a problem such as occurrence of fine cracks as shown in FIG. 1 occurs.

In the present disclosure, in order to solve the above-described problem, a gradient is formed on each of the driving rolls in the width direction of the current collector. Due thereto, at the beginning of drying as shown in FIG. 5, i.e., in a state in which the coating layer has fluidity, a gradient is formed on the current collector while the current collector moves through the driving rolls on which the gradients are formed, and as the solvent evaporates during the course of a drying process and the shrinkage of the coating layer proceeds completely, the electrode is changed to a flat state after drying as shown in FIG. 5. This ensures that the electrode can pass through the rolls in a linear line and that deformation of the electrode can be minimized even after rewinding.

Meanwhile, referring to FIG. 2, in the system for manufacturing the lithium ion secondary battery according to the embodiment of the present disclosure, the plurality of driving rolls may be provided in the drying device 300. In this case, an amount of the gradient formed on each of the plurality of driving rolls may be configured such that the amount of the gradient formed on a driving roll located at an inlet of the drying device 300 is the largest, and the amount of the gradient formed on each of the driving rolls may gradually decrease toward an outlet of the drying device. Herein, the reason why the amount of the gradient formed on the driving roll located at the inlet of the drying device is the largest is that the fluidity of the coating layer coated on the current collector at the beginning of drying is the largest. In addition, the reason why the amount of the gradient formed on each of the driving rolls decreases toward the outlet of the drying device is to prevent damage to the electrode due to the gradient because the fluidity of the coating layer disappears toward the outlet of the drying device.

Meanwhile, as shown in FIG. 3, the drying nozzle 320 may be configured such that a gradient is formed in the width direction of the current collector that moves through the driving rolls. As such, due to the gradient of the drying nozzle 320 formed in the width direction of the current collector moving through the driving rolls, when spraying the air of the predetermined temperature and the predetermined amount to the current collector moving through the driving rolls, a gradient can be formed on the current collector in the width direction thereof.

As described above, according to the present disclosure, the gradient is formed on the drying nozzle in the width direction of the current collector moving through the driving rolls. Due thereto, at the beginning of drying as shown in FIG. 5, i.e., when the current collector in which the coating layer has fluidity moves through the driving rolls, the air of the predetermined temperature and the predetermined amount is sprayed toward to the current collector to form a gradient on the current collector, and as the solvent evaporates during the course of the drying process and the shrinkage of the coating layer proceeds completely, the electrode is changed to a flat state after drying as shown in FIG. 5. This ensures that the electrode can pass through the rolls in a linear line and that deformation of the electrode can be minimized even after rewinding.

Meanwhile, as shown in FIG. 4, the drying nozzle 320 may spray air to the current collector by forming a gradient in wind speed in the width direction of the current collector moving through the driving rolls. As such, due to the fact that the drying nozzle 320 sprays the air toward the current collector by forming the gradient in wind speed in the width direction of the current collector moving through the driving rolls, a gradient may be formed on the current collector in the width direction thereof.

As described above, according to the present disclosure, the air is sprayed toward the current collector by forming the gradient in wind speed in the width direction of the current collector moving the driving rolls. Due thereto, at the beginning of drying as shown in FIG. 5, i.e., when the current collector in which the coating layer has fluidity moves through the driving rolls, the gradient is formed on the current collector, and as the solvent evaporates during the course of the drying process and the shrinkage of the coating layer proceeds completely, the electrode is changed to a flat state after drying as shown in FIG. 5. This ensures that the electrode can pass through the rolls in a linear line and that deformation of the electrode can be minimized even after rewinding.

Meanwhile, the controller 600 may allow air to be sprayed from the drying nozzle such that an amount of gradient is maximum in a state in which the coating layer has fluidity on the basis of drying information of the coating layer sensed by the sensor 500, and may allow an amount of the air sprayed from the drying nozzle to be decreased such that the amount of gradient decreases as the degree of drying of the coating layer increases.

In other words, the controller 600 may allow a relatively strong air to be sprayed in the drying nozzle provided at the inlet of the drying device such a large amount of gradient is formed on the current collector, and may allow a relatively weak air to be sprayed from the drying nozzle provided at the outlet of the drying device such that a relatively small amount of gradient is formed on the current collector.

In one embodiment, the controller 600 may allow the air to be sprayed intensively toward widthwise opposite ends of the current collector moving through the driving rolls such that gradients are formed only at the opposite ends.

The rewinder 400 serves to rewind the coated current collector passing through the drying device 300 at a predetermined position with a constant tension.

Figure 6A:
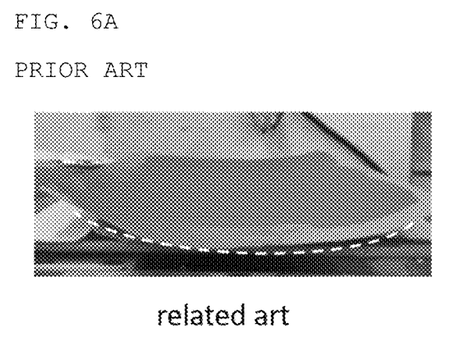
FIGS. 6A and 6B are experimental photographs showing a state after drying of a lithium ion secondary battery according to the related art and the present disclosure.
Figure 6B:
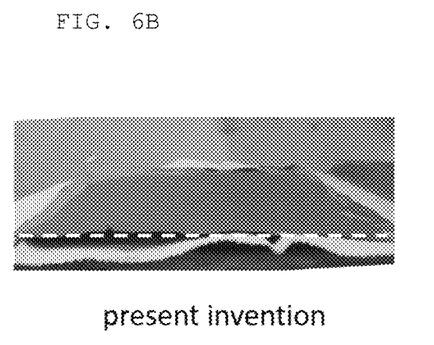

FIGS. 6A and 6B are experimental photographs showing a state after drying of a lithium ion secondary battery according to the related art and the present disclosure. As shown in FIGS. 6A and 6B, according to the present disclosure, by forming a gradient on the electrode at the beginning of drying in consideration of the amount of shrinkage at the beginning of drying and after drying, the electrode can be changed to a flat state after drying. This makes it possible to hardly cause deformation of the electrode even when the electrode passes through the rolls and is rewound on the rewinder.

Figure 7:
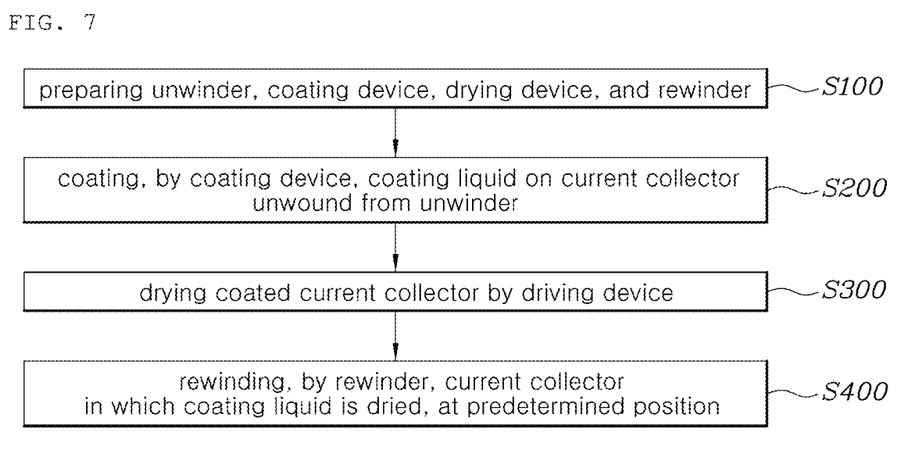
FIG. 7 is a flowchart showing a method of manufacturing a lithium ion secondary battery according to an embodiment of the present disclosure.

FIG. 7 is a flowchart showing a method of manufacturing a lithium ion secondary battery according to an embodiment of the present disclosure. Referring to FIG. 7, a method of manufacturing a lithium ion secondary battery according to an embodiment of the present disclosure may include: preparing an unwinder supplying a current collector to be coated to a predetermined position, a coating device coating a coating liquid on the current collector, a drying device including a driving roll and a drying nozzle and drying the coated current collector, and a rewinder winding the coated current collector passing through the drying device at a predetermined position (S100); coating, by the coating device, the coating liquid on the current collector unwound from the unwinder (S200); drying the coated current collector by the driving device (S300); and rewinding, by the rewinder, the current collector, in which the coating liquid is dried, at a predetermined position (S400).

The method may further include preparing a sensor sensing a degree of drying of the coating layer coated on the current collector, and a controller controlling driving of the drying nozzle on the basis of information sensed by the sensor.

In detail, the preparing the drying device including the driving roll and the drying nozzle and drying the coated current collector may further include forming a gradient on each of the driving roll and the drying nozzle in a width direction of the current collector.

In more detail, in one embodiment, in the forming the gradient on each of the driving roll and the drying nozzle in the width direction of the current collector, the shape of the gradient may be changed by increasing or decreasing radius of curvature on the basis of a circle.

In another embodiment, in the forming the gradient on each of the driving roll and the drying nozzle in the width direction of the current collector, the shape of the gradient may be changed by increasing or decreasing eccentricity on the basis of an ellipse with the same semi-major axis. Herein, it is preferable that the eccentricity is 0.7 to 0.99, and the semi-major axis is equal to or greater than 1.2 times the width of the current collector.

In another embodiment, in the forming the gradient on each of the driving roll and the drying nozzle in the width direction of the current collector, the shape of the gradient may be changed by increasing or decreasing eccentricity on the basis of an ellipse with the same semi-minor axis. Herein, it is preferable that the eccentricity is 0.7 to 0.99, and the semi-minor axis is equal to or less than 0.2 times the width of the current collector.

Meanwhile, the drying the coated current collector by the drying device may further include: sensing, by the sensor, the degree of drying of the coating layer coated on the current collector; and controlling driving of the drying nozzle on the basis of sensed information.

In detail, in the controlling the driving of the drying nozzle on the basis of the sensed information, a maximum amount of air may be sprayed from the drying nozzle such that an amount of gradient is maximum in a state in which the coating layer has fluidity, and an amount of the air sprayed from the drying nozzle may be decreased such that the amount of gradient decreases as the degree of drying of the coating layer increases.

Although exemplary embodiments of the present disclosure have been described for illustrative purposes, those skilled in the art will appreciate that various modifications, additions and substitutions are possible, without departing from the scope and spirit of the disclosure as disclosed in the accompanying claims.

What is claimed is:

1. A system for manufacturing a lithium ion secondary battery, the system comprising:
    an unwinder supplying a current collector to be coated to a predetermined position;
    a coating device coating a coating liquid on the current collector;
    a drying device drying the coated current collector;
    a rewinder winding the coated current collector passing through the drying device at a predetermined position;
    a plurality of driving rolls supporting the coated current collector that move within the drying device, and move the current collector through a rotary motion;
    a plurality of drying nozzles drying the coated current collector moving through the driving rolls with air of a predetermined temperature and a predetermined amount, wherein the plurality of drying nozzles include a first drying nozzle positioned on an upper portion of the current collector and a second drying nozzle positioned on a lower portion of the current collector to face each other;
    a sensor sensing a degree of drying of a coating layer coated on the current collector; and
    a controller controlling driving of the plurality of drying nozzles based on information sensed by the sensor;
    wherein the first drying nozzle and the second drying nozzle are configured to spray air toward the current collector by each forming a gradient in wind speed in a width direction of the current collector moving through the plurality of driving rolls so that the gradient in wind speed output from the first drying nozzle differs from the gradient in wind speed output from the second drying nozzle.

2. The system of claim 1, wherein the controller allows the air to be sprayed from the plurality of drying nozzles such that an amount of gradient shape is maximum in a state in which the coating layer has fluidity based on the degree of drying of the coating layer sensed by the sensor, and the controller allows an amount of the air sprayed from the plurality of drying nozzles to be decreased such that the amount of gradient shape decreases as the degree of drying of the coating layer increases.

* * * * *